US010933384B2

(12) United States Patent
Cunsolo et al.

(10) Patent No.: US 10,933,384 B2
(45) Date of Patent: Mar. 2, 2021

(54) CRYOGEL FOR THE REMOVAL OF HEPARINS AND HEPARINOIDS FROM AQUEOUS SOLUTIONS, PHYSIOLOGICAL SOLUTIONS AND BIOLOGICAL FLUIDS, PREPARATION PROCESS AND USES THEREOF

(71) Applicant: Consiglio Nazionale Delle Ricerche, Rome (IT)

(72) Inventors: Francesca Cunsolo, Catania (IT); Tommaso Mecca, Catania (IT); Rita La Spina, Giarre (IT); Fabiola Spitaleri, Catania (IT)

(73) Assignee: Consiglio Nazionale Delle Ricerche, Rome (IT)

( * ) Notice: Subject to any disclaimer, the term of this patent is extended or adjusted under 35 U.S.C. 154(b) by 152 days.

(21) Appl. No.: 16/075,879

(22) PCT Filed: Feb. 9, 2017

(86) PCT No.: PCT/IB2017/050712
§ 371 (c)(1),
(2) Date: Aug. 6, 2018

(87) PCT Pub. No.: WO2017/137919
PCT Pub. Date: Aug. 17, 2017

(65) Prior Publication Data
US 2019/0030494 A1    Jan. 31, 2019

(30) Foreign Application Priority Data

Feb. 12, 2016    (IT) .................. 102016000014662

(51) Int. Cl.
*B01D 71/40*         (2006.01)
*B01J 20/26*         (2006.01)
(Continued)

(52) U.S. Cl.
CPC .......... *B01D 71/40* (2013.01); *B01D 61/243* (2013.01); *B01D 71/08* (2013.01); *B01J 20/261* (2013.01);
(Continued)

(58) Field of Classification Search
CPC ...... B01D 71/40; B01D 61/243; B01D 71/08; B01J 20/261; B01J 20/264; B01J 20/267;
(Continued)

(56) References Cited

U.S. PATENT DOCUMENTS 7,547,395 B2 *  6/2009  Mattiasson ............ B01D 15/26
                                                      210/198.2
8,709,452 B2    4/2014  Varghese et al.
(Continued)

FOREIGN PATENT DOCUMENTS

EP    0165568 A2    12/1985
WO    98/50017 A1   11/1998

OTHER PUBLICATIONS

La Spina, R., Tripisciano, C., Mecca, T., Cunsolo, F., Weber, V., Mattiasson, B, "Chemically modified poly(2-hydroxyethyl methacrylate) cryogel for the adsorption of heparin", J. Biomed. Mater. Res. Part B: Applied Biomaterials, 102, 6, 2014, 1207-1216 (Year: 2014).*
(Continued)

Primary Examiner — James C Goloboy
(74) Attorney, Agent, or Firm — Elmore Patent Law Group, P.C.; Joseph C. Zucchero; Carolyn S. Elmore

(57) ABSTRACT

The object of the present invention is a new cryopolymerization process that provides crosslinked polymeric materials in the form of a macroporous gel (cryogel) capable of sequestering (neutralize) the anticoagulant heparin, its low molecular weight derivatives (LMWH and ULMWH) and heparinoids, from aqueous solutions, physiological solutions and biological fluids, such as whole blood, serum and plasma.

(Continued)

A further object of the invention are also crosslinked polymeric materials in the form of a macroporous gel (cryogel) obtained by the cryopolymerization process of the invention that, thanks to said specific process, result to be comprised of varying proportions of HEMA and HEMA-R monomers. The molar ratio between the components (HEMA/HEMA-R) may vary between 99.9% HEMA:0.1% HEMA-R and 0.1% HEMA:99.9% HEMA-R.

Object of the invention is also the use of crosslinked polymeric materials in the form of a macroporous gel (cryogel) obtainable by the cryopolymerization process of the invention for the construction of filters, membranes or devices for the treatment of biological fluids.

A further object of the invention are therefore filters, membranes, or devices for the treatment of biological fluids which comprise materials obtained by the cryopolymerization process of the invention.

21 Claims, 6 Drawing Sheets

(51) Int. Cl.
| | | |
|---|---|---|
| C08F 220/20 | (2006.01) | |
| B01J 20/28 | (2006.01) | |
| B01D 61/24 | (2006.01) | |
| B01D 71/08 | (2006.01) | |
| C08J 3/075 | (2006.01) | |
| C08K 3/16 | (2006.01) | |
| C08K 3/26 | (2006.01) | |
| C08K 5/09 | (2006.01) | |
| C08K 5/10 | (2006.01) | |
| C08K 5/20 | (2006.01) | |
| C08L 5/10 | (2006.01) | |
| C08L 33/14 | (2006.01) | |

(52) U.S. Cl.
CPC ........... *B01J 20/264* (2013.01); *B01J 20/267* (2013.01); *B01J 20/28047* (2013.01); *C08F 220/20* (2013.01); *C08J 3/075* (2013.01); *C08K 3/16* (2013.01); *C08K 3/26* (2013.01); *C08K 5/09* (2013.01); *C08K 5/10* (2013.01); *C08K 5/20* (2013.01); *C08L 5/10* (2013.01); *C08L 33/14* (2013.01); *B01D 2257/00* (2013.01); *C08J 2333/14* (2013.01); *C08J 2405/10* (2013.01); *C08L 2203/02* (2013.01); *C08L 2312/00* (2013.01)

(58) Field of Classification Search
CPC .. B01J 20/28047; C08J 3/075; C08J 2333/14; C08J 2405/10; C08K 3/16; C08K 3/26; C08K 5/09; C08K 5/10; C08K 5/20; C08L 5/10; C08L 33/14; C08L 2203/02; C08L 2312/00; C08F 220/20
See application file for complete search history.

(56) References Cited

U.S. PATENT DOCUMENTS

2007/0082951 A1* 4/2007 Cunsolo ............... C07C 237/04
514/548
2012/0308546 A1 12/2012 Kizhakkedathu et al.

OTHER PUBLICATIONS

Capila, I., et al., "Heparin—Protein Interactions," Angew. Chem. Int. Ed., 41: 390-412 (2002).
Crowther, M.A., et al., "Mechanisms responsible for the failure of protamine to inactivate low-molecular-weight heparin," British Journal of Haematology, 116: 178-186 (2002).
Despotis, G. J., et al., "Anticoagulation Monitoring during Cardiac Surgery—A Review of Current and Emerging Techniques," Anesthesiology, 91: 1122-51 (1999).
Plieva, F., et al., "Macroporous polyacrylamide monolithic gels with immobilized metal affinity ligands: The effect of porous structure and ligand coupling chemistry on protein binding," J. Mol. Recognit., 19: 305-312 (2006).
Horrow, J. C., MD, "Protamine: A Review of its Toxicity," Anesth Analg., 64: 348-61 (1985).
La Spina, R., et al., "Chemically modified poly(2-hydroxyethyl methacrylate) cryogel for the adsorption of heparin," J Biomed Mater Res Part B, 00B: 1-10 (2014).
Sedlaĉik, T., et al., "Macroporous Biodegradable Cryogels of Synthetic Poly(α-amino acids)," Biomacromolecules, 16: 3455-3465 (2015).

* cited by examiner

CRYOGEL FOR THE REMOVAL OF HEPARINS AND HEPARINOIDS FROM AQUEOUS SOLUTIONS, PHYSIOLOGICAL SOLUTIONS AND BIOLOGICAL FLUIDS, PREPARATION PROCESS AND USES THEREOF

RELATED APPLICATIONS

This application is a US National stage entry of International Application No. PCT/IB2017/050712, which designated the United States and was filed on Feb. 9, 2017, published in English.

This application claims priority under 35 U.S.C. § 119 or 365 to IT, Application No. 102016000014662, filed Feb. 12, 2016. The entire teachings of the above applications are incorporated herein by reference.

DESCRIPTION

The object of the present invention is a new cryopolymerization process that provides crosslinked polymeric materials in the form of a macroporous gel (cryogel) capable of sequestering (neutralize) the anticoagulant heparin, its low molecular weight derivatives (LMWH and ULMWH) and heparinoids, from aqueous solutions, physiological solutions and biological fluids, such as whole blood, serum and plasma.

A further object of the invention are also crosslinked polymeric materials in the form of a macroporous gel (cryogel) obtained by the cryopolymerization process of the invention that, thanks to said specific process, result in varying proportions of HEMA and HEMA-R monomers. The molar ratio between the components (HEMA/HEMA-R) may vary between 99.9% HEMA:0.1% HEMA-R and 0.1% HEMA:99.9% HEMA-R.

Object of the invention is also the use of crosslinked polymeric materials in the form of a macroporous gel (cryogel) obtainable by the cryopolymerization process of the invention for the construction of filters, membranes or devices for the treatment of biological fluids.

A further object of the invention are therefore filters, membranes, or devices for the treatment of biological fluids which comprise materials obtained by the cryopolymerization process of the invention.

STATE OF THE ART

Heparin, a sulfonated polysaccharide belonging to the family of glycosaminoglycans, is a compound with anticoagulant activity due to its ability to accelerate the rate at which antithrombin inhibits the serine proteases involved in the process of blood coagulation cascade (G. J. Despotis, G. Gravlee, K. Filos, J. Levy, *Anesthesiology* (1999), vol. 91, pages 1122-1151).

In addition, in order to exert its anticoagulant action, heparin, together with its heparan sulfate analogous, is involved in many processes such as cell growth, migration, and differentiation. It intervenes, in fact, both free and bound to specific proteins, in angiogenesis and growth of tumor tissues (I. Capila, R. J. Linhardt, Angew. Chem. Int. Ed. (2002), vol. 41, pages 390-412).

By virtue of its anticoagulant action, heparin is widely used in postoperative protocols for the prevention of clots and thrombi resulting from interventions to the cardiovascular system. It is also used in procedures which involve an extracorporeal blood circulation, such as hemodialysis, in therapeutic protocols involving the use of artificial organs, and in organ transplants. In all these cases, the anticoagulant effect of the administered heparin must be controlled and, if necessary, neutralized to prevent fatal bleeding events. As a result, molecules capable of inhibiting or reducing heparin concentration in plasma may have interesting therapeutic applications.

Heparin derivatives commonly used in anticoagulant therapy comprise unfractionated heparin (UFH), low molecular weight heparins (LMWH: low molecular weight heparin and ULMWH: ultra-low molecular weight heparin), and heparinoids.

Currently, protamine sulfate is the only compound used systemically in the treatment of heparin overdose. Protamine is a low molecular weight protein, extracted from sperm cells of some types of fish, characterized by the presence of numerous arginine residues that make it highly basic. In a pH range comprised between 6 and 7, protamine, present in its cationic form, is able to neutralize the anionic heparin, by forming an insoluble and inactive complex.

The use of protamine is however ineffective in neutralizing low molecular weight heparins (M. A. Crowther, L. R. Berry, P. T. Monagle, A. K. C. Chan, *British Journal of Haematology* (2002), vol. 116, pages 178-186) and also, occasionally, may cause side effects, such as hypotension, bradycardia, thrombocytopenia, leukopenia, anaphylactic shock, etc. (J. C. Horrow, *Anesth. Analg.* (1985), vol. 64, pages 348-361).

In spite of continuous efforts to develop new and more efficient dialysis membranes, the process for anticoagulation and neutralization of the anticoagulant excess is still performed by heparin-protamine perfusion procedures.

In addition to the need for molecules safer than protamine, it would be desirable to develop alternative strategies for heparin neutralization, such as the use of extracorporeal devices that minimize the risk of bleeding that dialysis patients face.

The opportunity to sequestrate the high molecular weight heparin (i.e. unfractionated heparin with average molecular weight of 15,000 Dalton) by means of macroporous polymeric cryogel has been therefore investigated (La Spina R., Tripisciano C., Mecca T., Cunsolo F., Weber V., Mattiasson B. Chemically modified poly(2-hydroxyethyl methacrylate) cryogel for the adsorption of heparin. *J. Biomed. Mater. Res.* Part B, (2014), vol. 102, pages 1207-1216).

Cryogels are macroporous polymeric matrixes which are obtained by freezing and subsequent thawing of solutions of a monomeric or polymeric precursor in the presence of a crosslinking molecule (crosslinker). These materials are characterized by the presence of macropores interconnected one to the other, by a high contact area and a high elasticity. These properties provide cryogel substrates with a particularly high application potential in the filtration field.

In the study by La Spina R et. al. a biocompatible polyhydroxyethylmethacrylate cryogel (indicated as polyHEMA or pHEMA) was synthesized, characterized by the presence of primary alcoholic functions that can be easily functionalized (according to the process shown in Scheme 1). The functionalization, also called derivatization, of the alcoholic functions using the basic amino acid lysine (Lys) provides a cryogel with high absorbent properties towards high molecular weight heparin.

Scheme 1

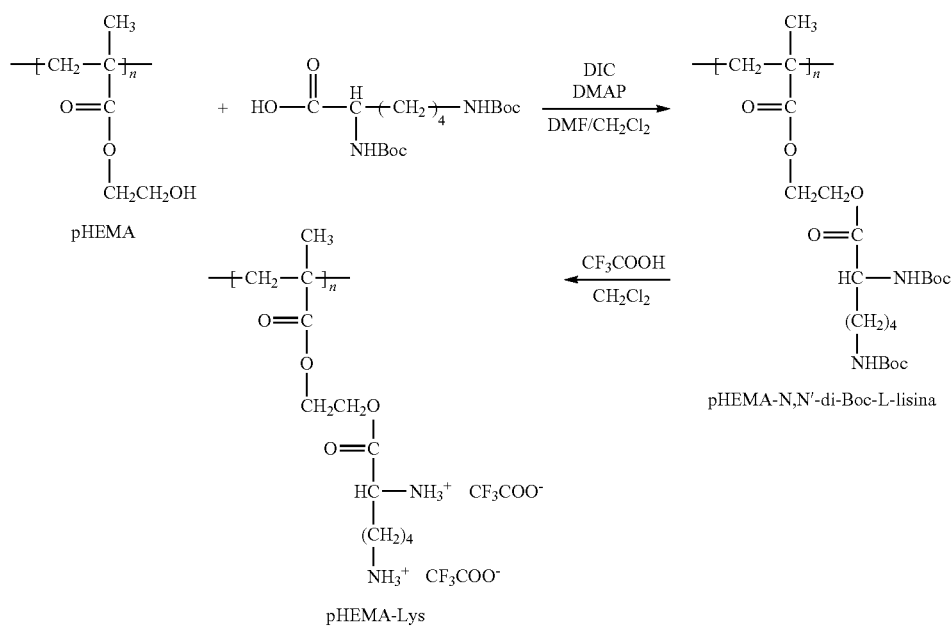

However, this material was obtained with a single percentage of derivatization, i.e. functionalization of the hydroxyl components, which is of about 55-60%. With the synthesis described by La Spina R et al., it is not possible to obtain other percentages of derivatization and, in addition, the material obtained is not functionalized in a completely homogeneous way.

It has to be noted that the percentage of functionalization of 55-60% was calculated a posteriori using $^1$H-MAS-NMR ($^1$H-Magic Angle Spinning-Nuclear Magnetic Resonance) measurements. As described in the above work, the NMR spectra of the two materials, pHEMA and pHEMA-Lys-diBoc, were compared (see FIG. 2 of the work). The percentage of functionalization was established from the ratio between the areas of two representative signals in the two spectra, the methyl signal at 0.91 ppm for pHEMA and the (CH$_2$N) group signal at 3.07 ppm for pHEMA-Lys.

Other macroporous gel usable as separation means in different fields, such as chromatographic separations, and method for obtaining them are described in the U.S. Pat. No. 7,547,395 in the name of Protista Biotechnology.

The EP165568 document, in the name of Braun Mesulgen, describes a process for the adsorption of heparin and similar substances from a solution of whole blood, plasma and/or solutions containing them, through an extracorporeal circulation system which provides for the separation of heparin by a resin ion-exchange properties means.

The U.S. Patent Application US20120308546, in the name of British Columbia University, describes dendritic polymer polyols for the removal of heparin, while the international application WO9850017, in the name of Georgia Tech Research Institute, describes a cryogel based on polyvinyl alcohol as a substitute for human tissues.

In addition, U.S. Pat. No. 8,709,452B2, in the name of University of California, describes cryogels and macroporous compositions with anionic pendants for bone tissue engineering.

It is therefore still felt the need for a polymeric material having improved filtering characteristics and sequestering properties for heparin (UFH), but especially for low molecular weight heparins (LMWH and ULMWH) and heparinoids, which is easy to manufacture, homogeneous and for which it is possible to control the composition so as to adjust the heparin amount and/or fraction to be sequestrated from aqueous solutions, physiological solutions and biological fluids (blood, serum and plasma).

Definitions

Unless otherwise defined, all terms of the art, notations, and other scientific terms used herein are intended to have the meanings commonly understood by those skilled in the art to which this description belongs. In some cases, terms with meanings that are commonly understood are defined herein for clarity and/or ready reference; therefore, the inclusion of such definitions herein should not be interpreted as being representative of a substantial difference with respect to what is generally understood in the art.

The terms "comprising", "having", "including" and "containing" are to be construed as open-ended terms (i.e., meaning "comprising, but not limited to"), and are to be considered as a support also for terms such as "consist essentially of", "consisting essentially of", or "consisting of".

The terms "consist essentially of", "consisting essentially of" are to be construed as semi-closed terms, meaning that no other ingredients which materially affects the novel characteristics of the invention are included.

The terms "consist of", "consisting of" are to be construed as closed terms.

"Heparin" means unfractionated heparin (with an average molecular weight of 15,000 Dalton), also defined using the acronym UFH: unfractionated heparin, while "low molecular weight heparins" means the fractions commonly having the acronyms LMWH: low molecular weight heparin (with a molecular weight comprised between 4,000 and 6,000 Dalton), and ULMWH: ultra-low molecular weight heparin (with a molecular weight ≤3,000 Dalton). "Heparinoids" means sulfonated oligo- and polysaccharides, said glycosaminoglycans, chemically similar to heparin, such as chondroitin sulfate, dermatan sulfate, heparan sulfate, etc.

The acronym "HEMA" means the 2-hydroxyethyl methacrylate monomer.

The acronym "HEMA-Lys" means the lysinate ester of the 2-hydroxyethyl methacrylate monomer (2-hydroxyethyl methacrylate-1-lysinate ester) that is formed by esterification of the carboxylic acid moiety of the amino acid lysine with the alcoholic moiety of HEMA.

The acronym "HEMA-R" means the 2-hydroxyethyl methacrylate-R ester monomer, wherein R is the acyl residue of a natural amino acid or of a linear or branched aliphatic $C_2$-$C_8$ chain amino acid. Acyl residues of basic amino acids are preferred. Even more preferred are acyl residues deriving from the amino acids lysine, arginine, histidine, β-alanine, γ-amino-butyric acid, 6-aminohexanoic acid, 8-amino-octanoic acid, norleucine, or glycine.

For the purposes of the biological use of the materials, all or part of the amino residues in the R groups are salified with a physiologically compatible acid, and are present in cationic form in the product synthesized by the process of the invention. Preferred physiologically compatible acids are organic or inorganic acids such as, for example, hydrochloric, phosphoric, citric acid, sulfuric, lactic, acetic, trifluoroacetic acid, and carbonic acid.

The term "Q" means the molar ratio between HEMA monomer and HEMA-R monomer.

The term "C" means the sum of HEMA and HEMA-R molar concentrations.

In the context of this invention the terms "functionalize" and "derivatize" are to be considered synonymous.

In the context of this invention the terms "sequester" or "neutralize" means the action of the cryogel obtained by the process of the present invention on heparin, low molecular weight heparins and heparinoids, i.e. the interaction between the cryogel cationic amino groups and the anionic sulfonic and carboxylic groups in heparin, low molecular weight heparins and heparinoids.

The term "cryogel" means a macroporous polymeric matrix obtained by freezing and subsequent thawing of solutions of one or more monomeric or polymeric precursors in the presence of a crosslinking molecule (crosslinker).

The acronym "Old pHEMA-Lys" means the lysine derivatized polymeric material described in the publication by La Spina R. et al., *J. Biomed. Mater. Res. Part B*, (2014), vol. 102, pages 1207-1216.

The acronym "pHEMA-Lys" means a monolithic cryogel based on mixtures of lysinate ester of 2-hydroxyethylmetacrylate and hydroxyethylmethacrylate, with variable composition of the two-components.

The acronym "pHEMA-Lys X %" means a monolithic cryogel having a percentage of 2-hydroxyethylmetacrylate lysinate ester equal to X %.

The acronym "APS" means ammonium persulfate compound.

The acronym "Boc-Lys(Boc)-OH DCHA" means $N_\square,N_\square$-bis(tert-butoxycarbonyl)-L-lysine dicyclohexylammonium salt.

The acronym "DMAP" means 4-(dimethylamino)pyridine compound.

The acronym "DCC" means N,N'-dicyclohexylcarbodiimide compound.

The acronym "DMF" means N,N-dimethylformamide compound.

The acronym "MBAA" means N,N'-methylenebisacrylamide compound.

The acronym "TEMED" means the compound N,N,N',N'-tetramethylethylenediamine.

DESCRIPTION

Figure 1:
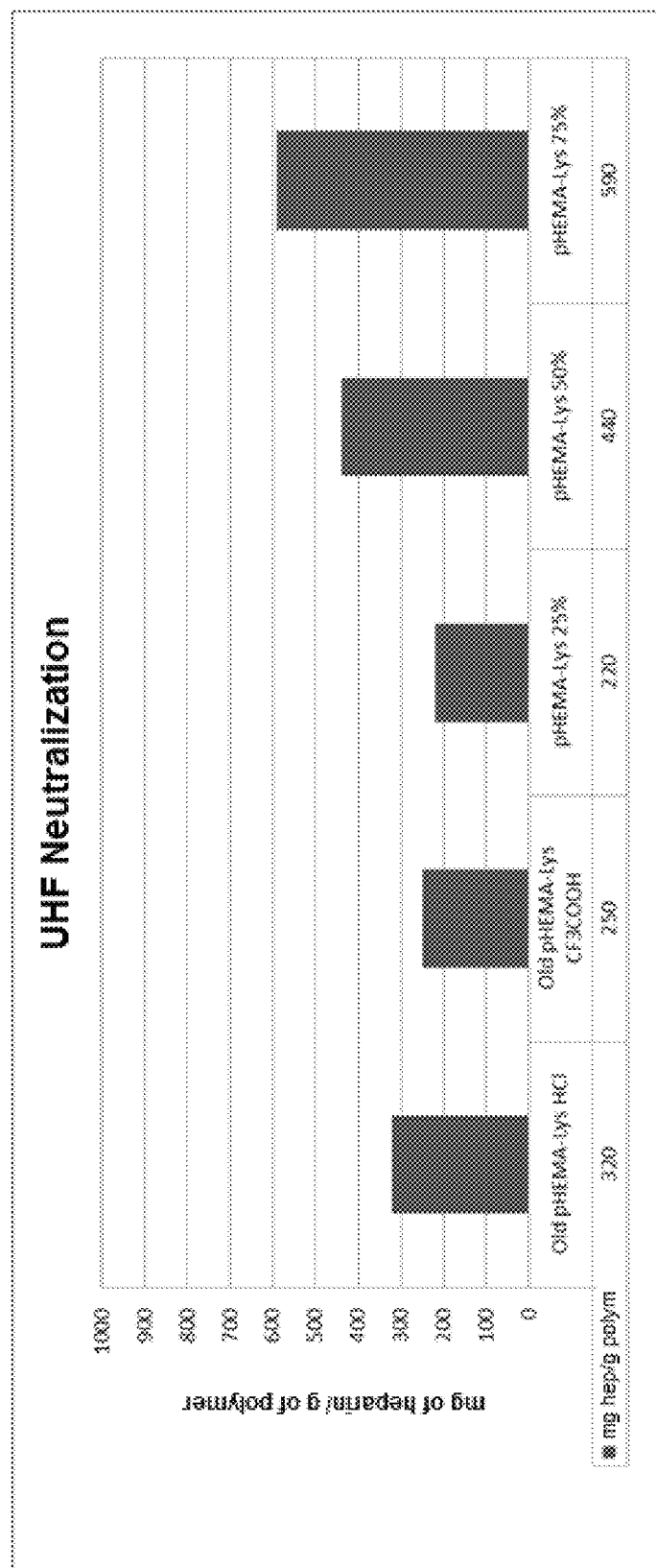
FIG. 1 depicts a graph comparing the unfractionated heparin (UFH) neutralization performances of the old material (cryogel) Old pHEMA-Lys, whose amino groups are salified with either hydrochloric acid, as obtained by the process described in La Spina et al., or trifluoroacetic acid, compared to the new materials (cryogel) obtained by the process of the present invention (25% pHEMA-Lys, 50% pHEMA-Lys, 75% pHEMA-Lys), whose amino groups (present in all test compounds) are salified with trifluoroacetic acid. The increase in the new materials sequestering capacity is clear, as 10 mg of 50% pHEMA-Lys, while containing a lower percentage of functionalization, are able to complex about 76% more heparin compared to a sample of the same weight of the old material Old pHEMA-Lys. The amounts of sequestered heparin increase with increasing percentages of functionalization, although with a non-linear trend for all concentration ranges.
Figure 2:
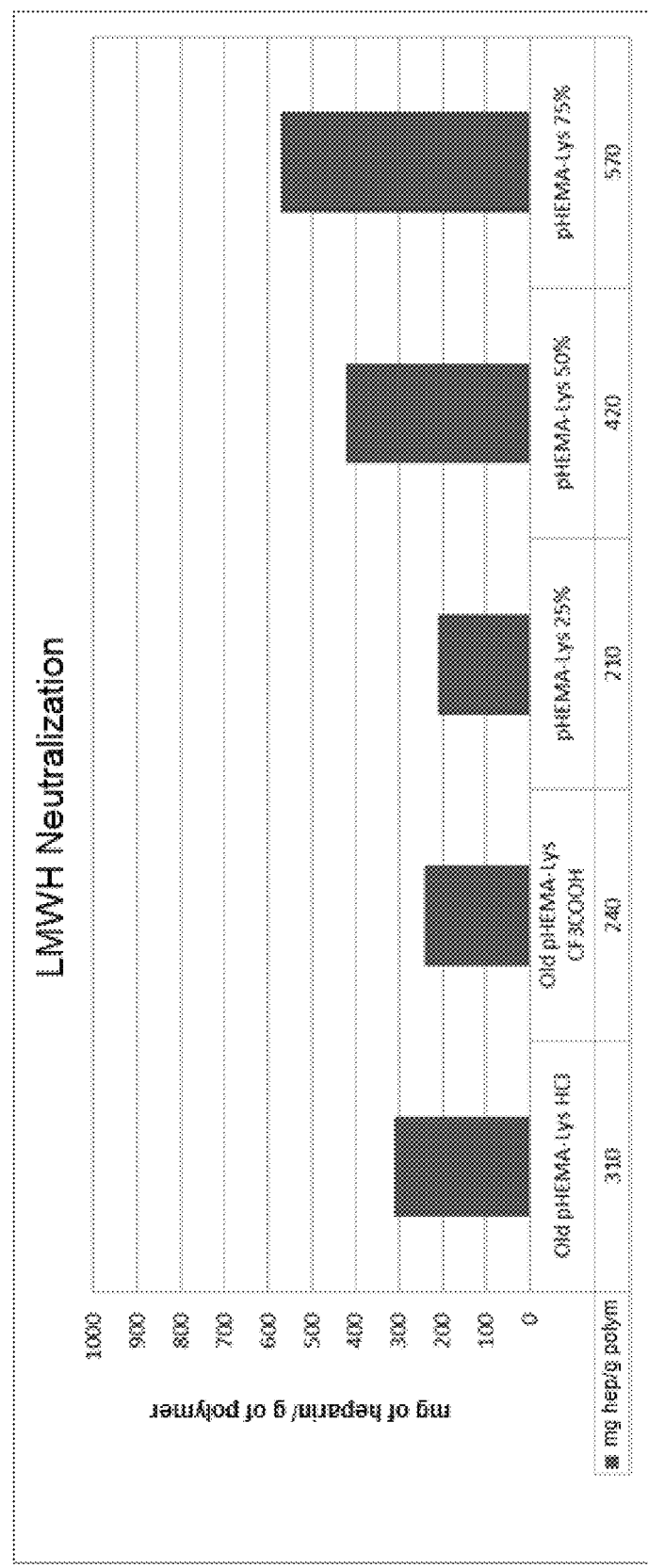
FIG. 2 depicts a graph comparing the low molecular weight heparin (LMWH) neutralization performances of the new materials (cryogel) obtained by the process of the present invention (25% pHEMA-Lys, 50% pHEMA-Lys, 75% pHEMA-Lys, wherein the amino groups present in all compounds are salified with trifluoroacetic acid), with respect to the old material (cryogel) Old pHEMA-Lys, whose amino groups are salified with either hydrochloric acid, as obtained by the process described in La Spina et al., or trifluoroacetic acid. The amounts of LMWH sequestered by the materials obtained by the process of the present invention are very similar to the amounts of UFH, with a maximum deviation lower than 5% and with performances improved by 75% for the new material having a functionalization percentage comparable to the old one, highlighting also in this case excellent LMWH neutralization performances.
Figure 3:
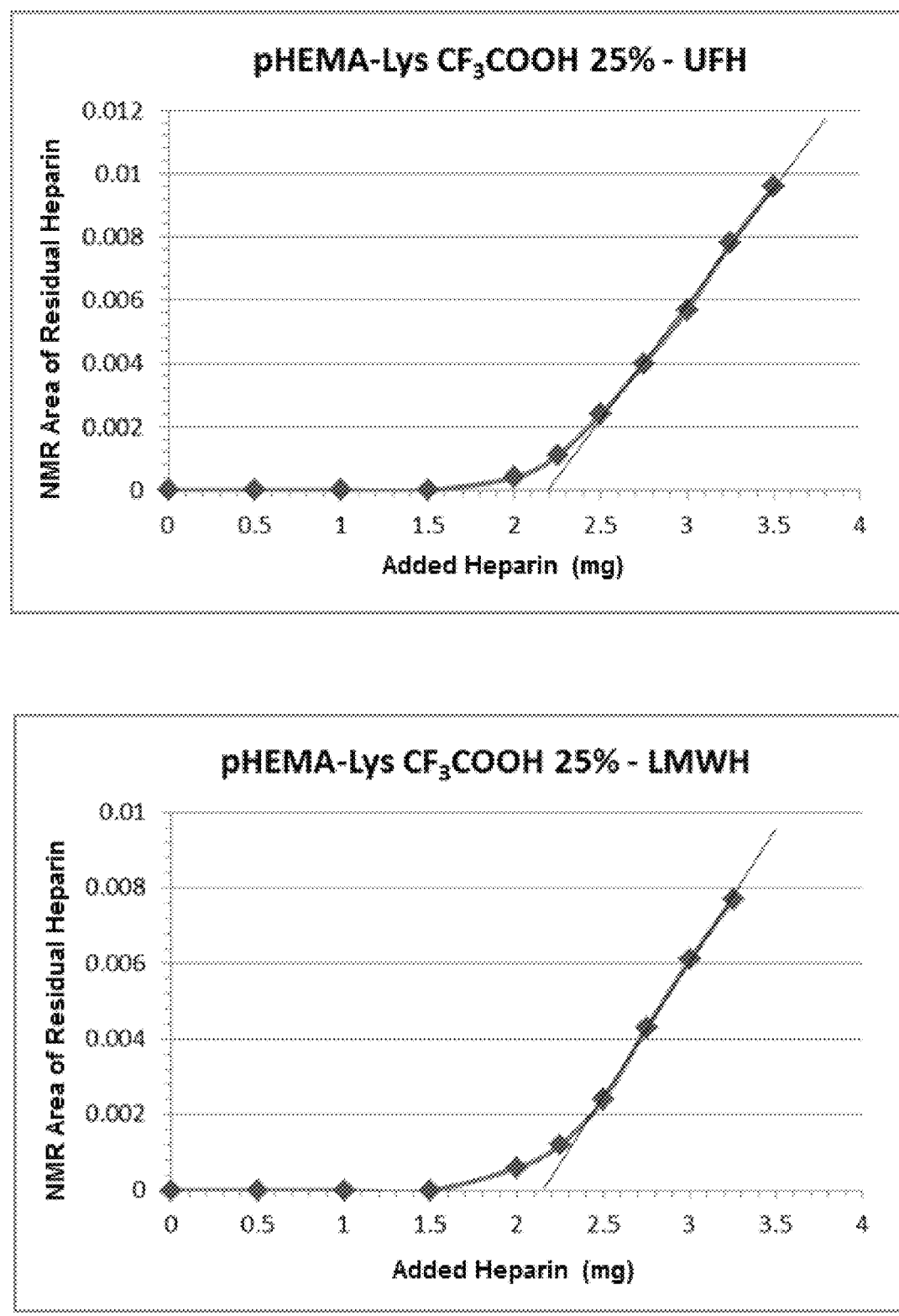
FIG. 3 depicts two graphs that allow to evaluate the amounts of unfractionated heparin (UFH=2.2 mg) and low molecular weight (LMWH=2.1 mg) sequestered by 10 mg of cryogel obtained by the method of the invention, wherein the HEMA-Lys monomer is present at 25%, and wherein the amino group in the cryogel are salified with trifluoroacetic acid (cryogel 25% pHEMA-Lys $CF_3COOH$).
Figure 4:
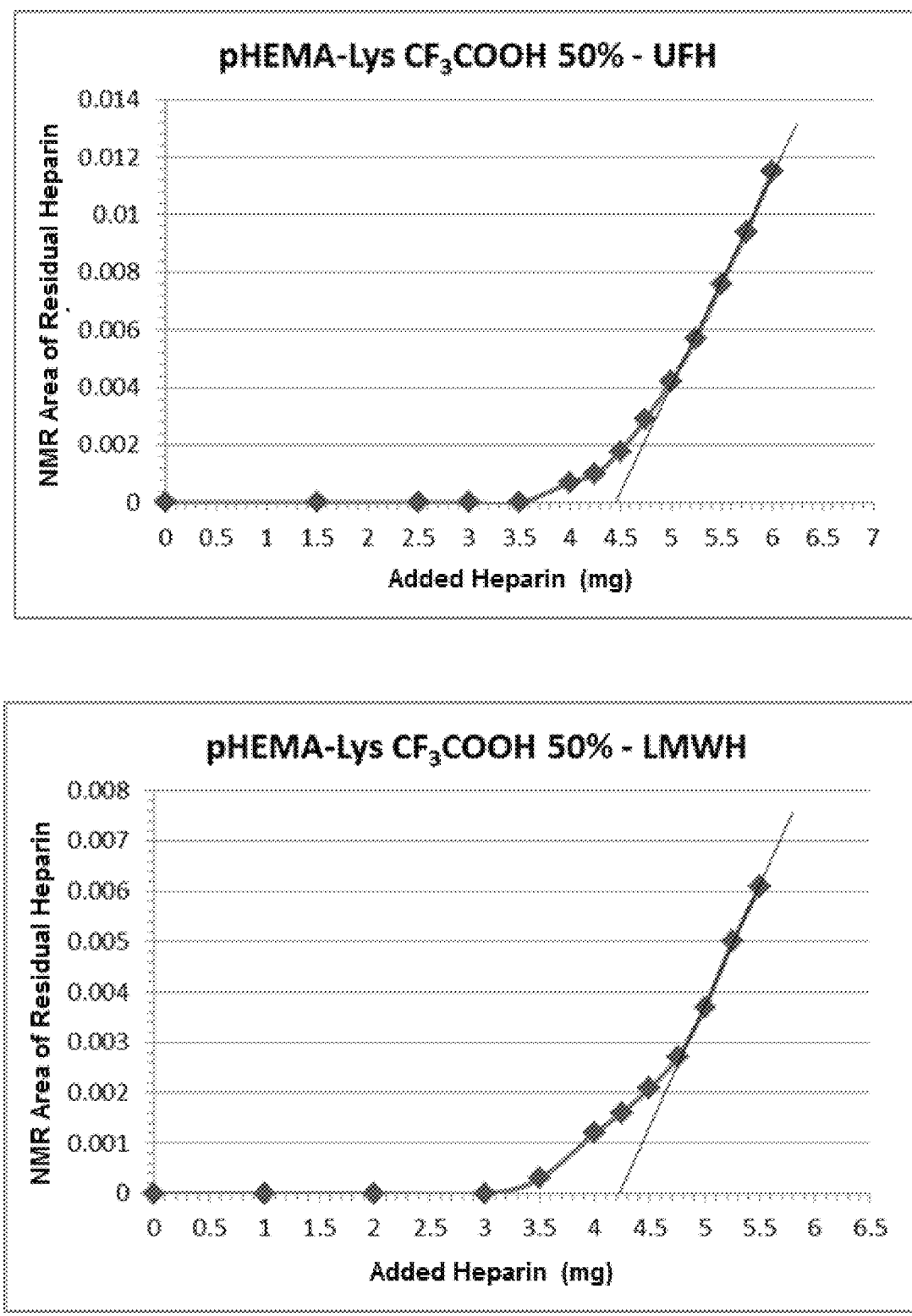
FIG. 4 depicts two graphs that allow to evaluate the amounts of unfractionated heparin (UFH=4.4 mg) and low molecular weight (LMWH=4.2 mg) sequestered by 10 mg of cryogel obtained by the method of the invention, wherein the HEMA-Lys monomer is present at 50%, and wherein the amino group in the cryogel are salified with trifluoroacetic acid (cryogel 50% pHEMA-Lys $CF_3COOH$).
Figure 5:
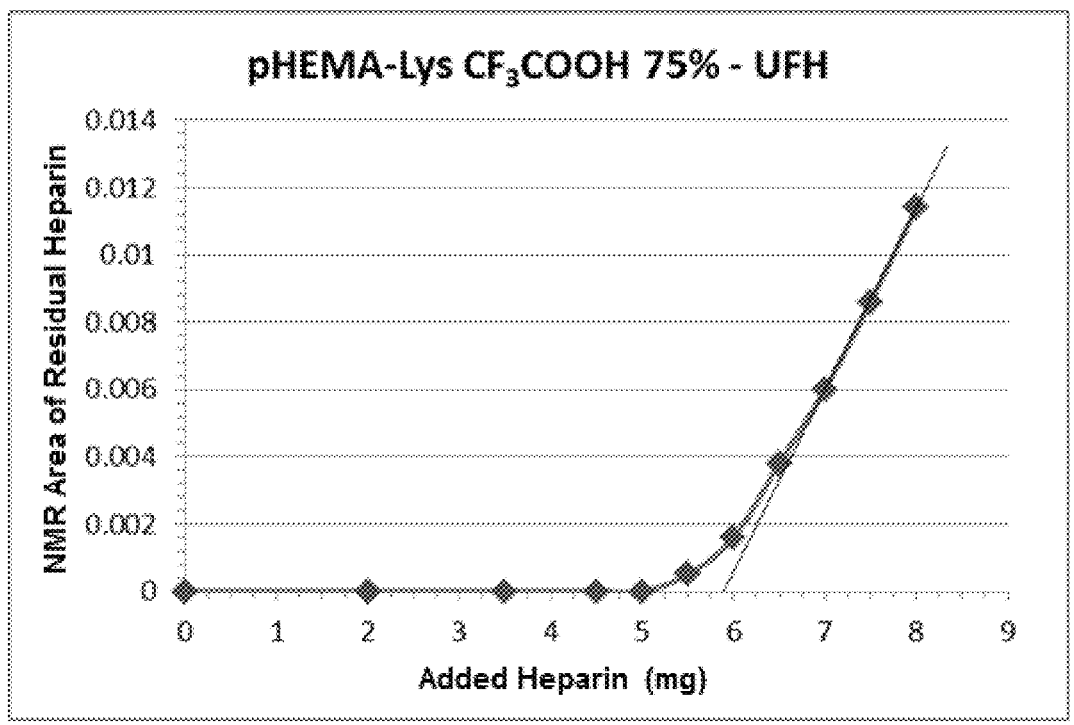
FIG. 5 depicts two graphs that allow to evaluate the amounts of unfractionated heparin (UFH=5.9 mg) and low molecular weight heparin (LMWH=5.7 mg) sequestered by 10 mg of cryogel obtained by the method of the invention, wherein the HEMA-Lys monomer is present at 75% and wherein the amino group in the cryogel are salified with trifluoroacetic acid (cryogel 75% pHEMA-Lys $CF_3COOH$).
Figure 5:
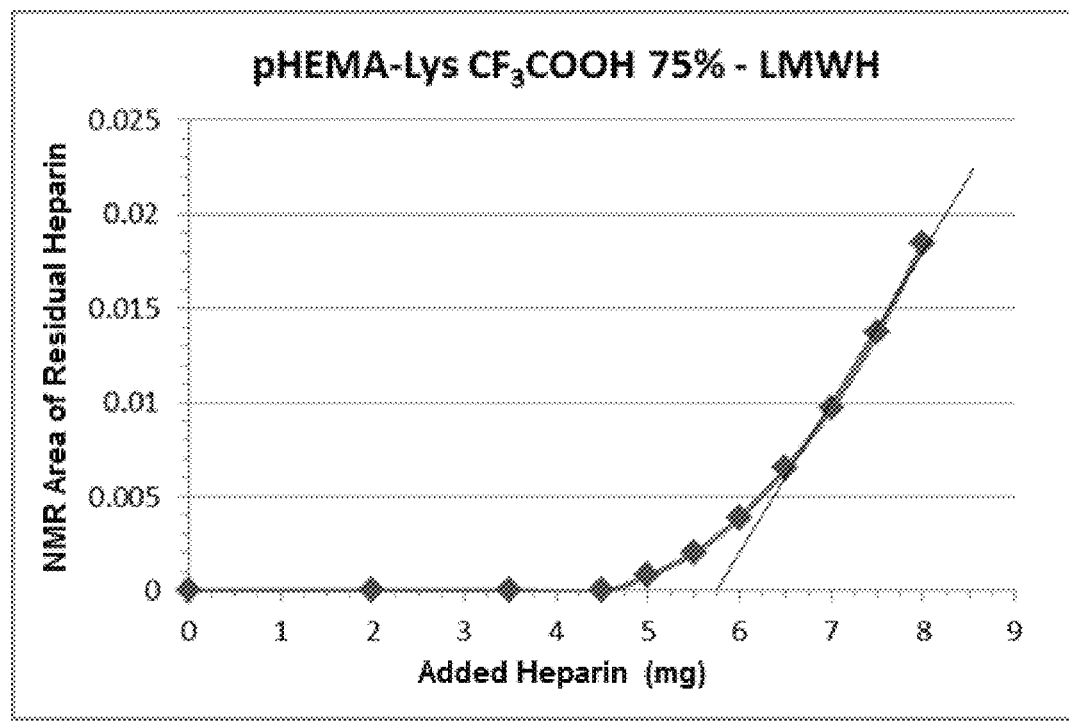
Figure 6:
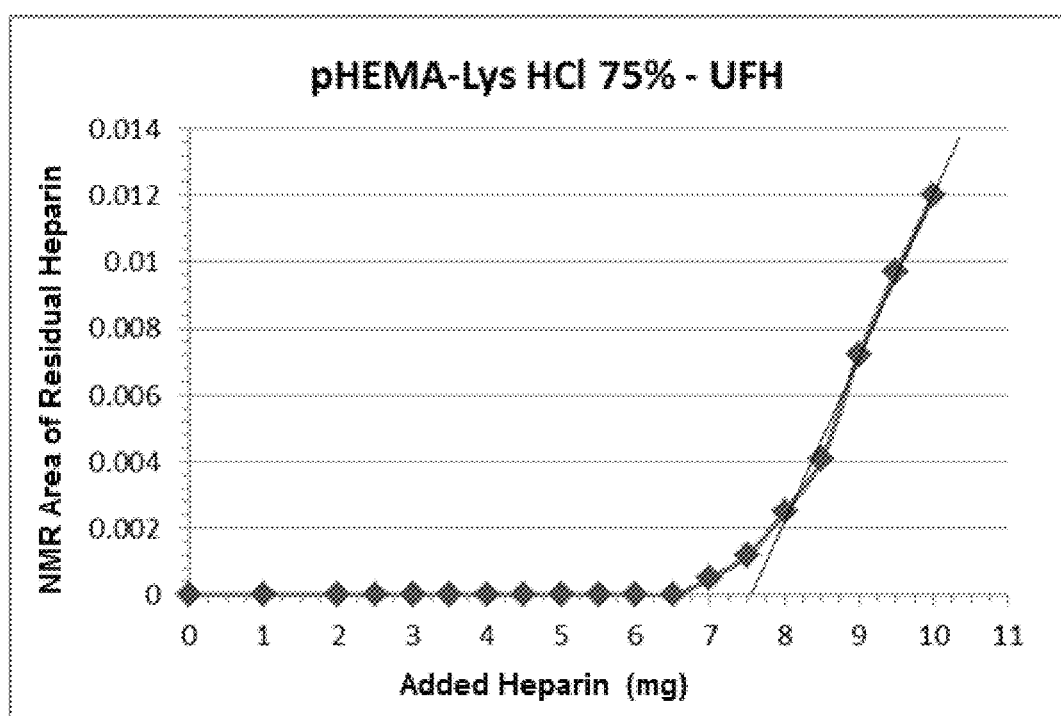
FIG. 6 depicts a graph that allow to evaluate the amounts of unfractionated heparin (UFH=7.6 mg) sequestered by 10 mg of cryogel obtained by the method of the invention, wherein the HEMA-Lys monomer is present at 75%, and wherein the amino group in the cryogel are salified with hydrochloric acid (cryogel 75% pHEMA-Lys HCl). The increase in the amount of heparin sequestered, at equal weight, compared to the analogue compound salified with trifluoroacetic acid, is essentially due to the molecular weight difference of the two different counterions.

The object of the present invention is a new cryopolymerization process that provides crosslinked polymeric materials in the form of a macroporous gel (cryogel) capable of sequestering (neutralize) the anticoagulant heparin, its low molecular weight derivatives (LMWH and ULMWH) and heparinoids, from aqueous solutions, physiological solutions and biological fluids, such as whole blood, serum and plasma.

A further object of the invention are also crosslinked polymeric materials in the form of a macroporous gel (cryogel) obtained by the cryopolymerization process of the invention that, thanks to said specific process, result to be comprised of varying proportions of HEMA and HEMA-R monomers. The molar ratio between the components (HEMA/HEMA-R) may vary between 99.9% HEMA:0.1% HEMA-R and 0.1% HEMA:99.9% HEMA-R.

Said polymeric material has not only improved filtration characteristics and sequestering properties towards unfractionated heparin (UFH), but is also effective in neutralizing both low molecular weight heparins (LMWH and ULMWH) and heparinoids. It has the advantage to be easy to manufacture, homogeneous and it is possible to control the composition of the polymeric material obtained so as to adjust the heparin amount and/or fraction to be desirably sequestrated from aqueous solutions, physiological solutions and biological fluids (blood, serum and plasma). Object of the invention is also the use of the crosslinked polymeric materials in the form of a macroporous gel (cryogel) obtainable by the cryopolymerization process of the invention for the construction of filters, membranes, or devices for the treatment of biological fluids, such as for example filtering devices for dialysis.

A further object of the invention are therefore filters, membranes, or devices for the treatment of biological fluids which comprise materials obtained by the cryopolymerization process of the invention.

The process of the present invention is a synthesis of crosslinked polymeric materials in the form of a macroporous gel (cryogel) which comprises a step of freezing a solution, which may preferably be aqueous or consists of a mixture of polar organic solvents which ensure the solubility of the reagents with a freezing temperature above −25° C., for example dimethylsulfoxide, dioxane, acetamide, tert-butyl alcohol, or mixtures thereof, in which the polymerization takes place in the presence of a crosslinking agent containing 2-hydroxyethylmethacrylate (HEMA) monomer and at least one 2-hydroxyethylmethacrylate-R (HEMA-R) ester monomer of the following formula:

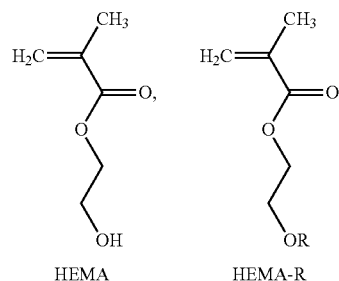

wherein R is the acyl residue of a natural amino acid or of a linear or branched aliphatic $C_2$-$C_8$ chain amino acid. Acyl residues of basic amino acids are preferred. Even more preferred are acyl residues deriving from the amino acids lysine, arginine, histidine, β-alanine, γ-amino-butyric acid, 6-amino-hexanoic acid, 8-amino-octanoic acid, norleucine, or glycine. Mostly preferred is the acyl residue deriving from glycine or arginine.

According to a preferred aspect, at least two HEMA-R monomers are present, wherein the acyl residues R are different one to the other.

According to a further preferred aspect, said two acyl residues R different one to the other are selected from pairs of acyl residues of the amino acids lysine-arginine, lysine-histidine, lysine-glycine, lysine-β-alanine, lysine-γ-amino-butyric acid.

The molar ration between HEMA and HEMA-R monomers (HEMA:HEMA-R) may vary between 99.9% HEMA: 0.1% HEMA-R and 0.1% HEMA:99.9% HEMA-R.

The term Q means the ratio between HEMA (indicated by Y) and HEMA-R (indicated by X) by moles, i.e. Q=HEMA moles/HEMA-R moles=Y/X. Preferred values for Q are 3, 1 and 0.33 corresponding to percentage values for HEMA:HEMA-R of 75%:25% (25% pHEMA-Lys, when R is the residue of the amino acid lysine), of 50%:50% (50% pHEMA-Lys, when R is the residue of the amino acid lysine), and of 25%:75% (75% pHEMA-Lys, when R is the residue of the amino acid lysine).

The sum of HEMA and HEMA-R molar concentrations is named C.

Preferably, an amount by moles of crosslinking agent in the range of 1/10-1/3 is used in the synthesis, based on the sum of the moles of monomers used.

The pH of the solution containing the HEMA and HEMA-R monomers, and the crosslinking agent is preferably comprised between 7.0 and 8.0. Optionally, the pH may be adjusted using diluted acids and bases, preferably using diluted NaOH or HCl.

According to a preferred aspect, the sum of HEMA and HEMA-R monomers (HEMA+HEMA-R) by weight is comprised in the range from 5% to 50%, based on the weight of the solvent used, which preferably is water.

Preferably, the polymerization reaction takes place at temperatures comprised between −10° C. and −25° C. (cryopolymerization), at which the solvent is present in the solid state, for a time varying between 12 and 48 hours.

Preferred crosslinking agents are all those compounds showing two polymerizable double bonds such as, for example, bisacrylates (esters or amides) such as, for example, MBAA, N,N'-methylenebismetacrylamide, N,N'-hexamethylenebisacrylamide, N,N-diallylacrylamide, diallyl fumarate, diallyl phthalate, and poly(ethylene glycol) diacrylate.

One or more initiators of radical polymerization (radical activator), such as organic and inorganic peroxides and peracids, azo compounds, and physical initiators, such as UV radiation, and one or more catalysts for the production of radicals, such as TEMED or equivalent compounds, may also be present.

Preferably, the radical activator is added in a concentration ranging from 0.5% to 10% by weight, based on the sum of HEMA and HEMA-R monomers by weight.

According to a particularly preferred aspect (named C), the sum of HEMA and HEMA-R molar concentrations, and Q their ratio (as already defined above), the process of the present invention involves the addition of X amount of HEMA-R by moles and a Y amount of HEMA by moles, where Y=Q·X, to a solution, preferably an aqueous solution, of crosslinking agent which is present in an amount by moles in the range of 1/10-1/3, based on the sum of monomers used by moles.

The mixture thus obtained is brought to 0° C., and it is estimated that the pH should be between 7.0 and 8.0. Otherwise, the pH shall be adjusted using diluted NaOH or HCl so as to be in the range of pH=7.0-8.0.

To this mixture, kept cold and under stirring, a radical activator in a concentration ranging from 0.5% to 10% by weight, based on the sum of monomers by weight, is added. If necessary, the volume is adjusted with water until the total concentration of the sum of monomers reaches the value equal to the desired concentration, C. The mixture thus obtained is cooled down to the minimum temperature of freezing, specific for each sample, and generally between −10° C. and −25° C. This temperature is maintained for a period of time between 12 and 48 hours. The material obtained after thawing the solvent is washed with water, suitably acidified with a physiologically compatible acid, ethanol and, optionally, with diethyl ether and pentane, before being dried under a nitrogen flow.

Preferably, the acyl residue R for HEMA-R is derived from lysine. In the following, the synthesis of the HEMA-Lys monomer will be shown.

According to a further preferred aspect, for the purposes of the biological use of the materials (cryogel) obtainable by the process of the present invention, all or part of the amino residues in the R groups are salified with a physiologically compatible acid, and are therefore present in cationic form in the finished product. Physiologically compatible acids are organic or inorganic acids such as, for example, hydrochloric, phosphoric, citric, sulfuric, lactic, acetic, trifluoroacetic, and carbonic acid. Particularly preferred are hydrochloric acid and trifluoroacetic acid.

A particularly preferred derivatized monomer (HEMA-R) is the HEMA-Lys monomer, which is obtained according to the following Scheme 2, wherein it is salified with trifluoroacetic acid:

Scheme 2

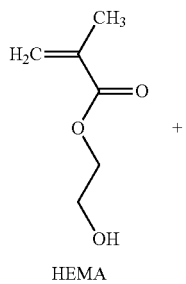

HEMA

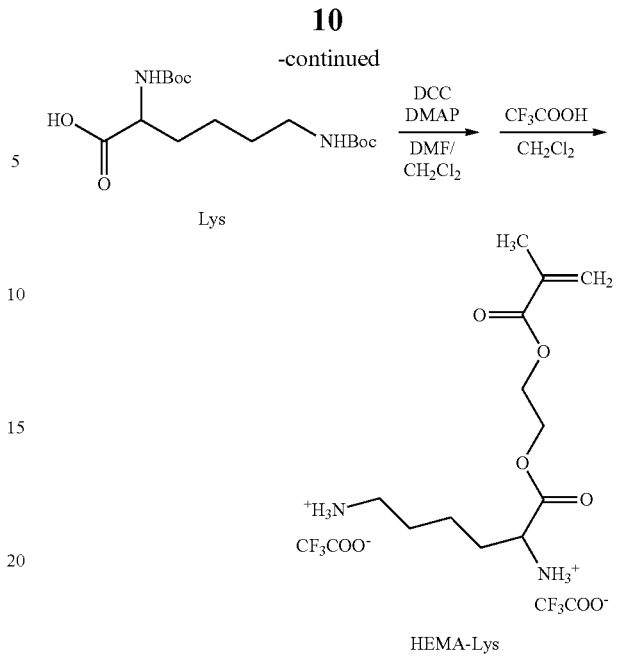

HEMA-Lys

The obtainment of the HEMA-Lys monomer, according to Scheme 2, is exemplified by Example 1 in the experimental part.

The synthetic process of the present invention provides crosslinked polymeric materials (cryogel) capable of sequestering the anticoagulant heparin, its low molecular weight derivatives (LMWH and ULMWH) and heparinoids from aqueous solutions, physiological solutions and biological fluids, such as whole blood, serum, and plasma.

The advantage of the process of the invention consists in the fact that it provides cryogels whose percentage of functionalization reflects the percentage of the monomers used, allows to obtain the desired percentages of monomers with certainty, furthermore providing the material with a completely homogeneous composition. Essentially, with the synthesis of the invention it is possible to determine a priori the composition of the material (cryogel) to be obtained, with the certainty of obtaining it, and, as a consequence, it is possible to design and obtain cryogels with the desired filtering and sequestering properties for heparin, its derivatives with a low molecular weight (LMWH and ULMWH) and heparinoids.

In fact, it is possible to design and obtain filtering systems which, at equal volumes, may exert a different sequestering effect towards heparin.

A further advantage is given by the possibility to proceed with the synthesis of the functionalized polymer (cryogel) using only water as a solvent, without using organic solvents that may be harmful to the operators and to the environment.

The results of preliminary experiments aimed at assessing the affinity for heparin (UFH) of the new materials obtainable by the process of the invention, in particular when R is an acyl residue deriving from lysine, i.e. pHEMA is pHEMA-R-Lys, are shown in the graph in FIG. 1.

Said experiments showed a significant increase of the new material capacity (25%, 50% and 75% pHEMA-Lys) to sequester unfractionated heparin when compared to the previously described and published material (Old pHEMA-Lys) whose percentage of functionalization is in the order of 55-60%.

As it can be seen from the graph, in fact, the greater the amount of HEMA-Lys present in the cryogel the greater the milligrams of heparin sequestered per gram of polymer.

However, using the previously existing cryogel synthetic techniques, it was only possible to obtain a cryogel with a nominal functionalization with lysine of 55-60% (Old pHEMA-Lys). However, it has to be noted how the cryogel at 50% of functionalization with lysine allows to sequester a quantity of heparin in any case considerably greater than the amount sequestered by the Old pHEMA-Lys cryogel.

As regards the sequestering activity of the Old pHEMA-Lys cryogel, it has also to be considered that the functionalization with lysine is carried out on a material already structured in the solid state, using as acylating agent the amino acid protected at the amino functions. This is therefore a heterogeneous synthesis that proceeds in an organic solvent between nonionic reagents. During the synthesis, thanks to the swelling effect due to the organic solvent, the solid polymer doubles its volume resulting in pores enlargement. At the end of the reaction, when washing with aqueous solvents are performed, the polymer shrinks and returns to its original shape. During this process, the porous structure is greatly affected, as it can also be deduced from optical microscopy data reported in La Spina R. et al.

In this way it is likely that some amino groups, that during the functionalization are arranged in the inner areas of the material, remain trapped inside the material itself and are no longer available for complexation with heparin. (The recognition occurs between complementary functions, therefore between the amino groups of the lysine pendants and the sulfonic and carboxylic groups present on heparin).

On the contrary, the process of the present invention is a homogeneous synthesis in which the reagents, HEMA and the preferred monomer, HEMA-Lys, both soluble in water, react together to form the polymer (cryogel) in its final structure. In this case the structuring of the material is guided essentially by the electrostatic equilibrium that will be established between the suitably solvated charged lysine groups present on the Lys-HEMA monomer. The water, therefore, doubly influences the structuring of the material, both in the formation of the pores, as a result of ice crystals that are formed during the polymerization, and the solvation, influencing the more or less ordered arrangement of the charged groups in the lysine pendants. At the end of the process of the invention, the new material will certainly have a more homogeneous composition compared to the Old pHEMA-Lys material, with the charged amino groups arranged towards the outside, in contact with the aqueous phase. Consequently, also its activity, in terms of availability to the complexation of the lysine amino groups, is improved.

The polymeric materials obtainable by the process of the invention were also investigated with respect to the sequestering capacity towards low molecular weight heparin derivatives (LMWH and ULMWH). The quantitative evaluation of the sequestering properties was performed by $^1$H-NMR titrations following the same procedure for all types of heparin used. A known amount of material was suspended in deuterated water, with terz-butyl alcohol as internal standard for the calculation of the areas. To the suspension, aliquots of solutions of heparins at known concentration were gradually added, and $^1$H-NMR spectra of the resulting mixtures were performed. The titration is continued until the area of one of the characteristic heparin signal at $\delta=1.95$ linearly grows with the additions, thus indicating saturation of the material. Plotting the area of that signal (with respect to the internal standard), against the amount of heparin added (in mg), it is possible to obtain a graph (see figures) whose intercept on the X axis of the straight line that best approximates the linear trend of the heparin signal, indicates the total amount of heparin sequestered by the cryogel sample.

The graphs in FIGS. 3, 4, 5 and 6 show the results of the titrations performed on materials (cryogel) obtainable according to the present invention with different percentage of pHEMA-Lys.

Object of the invention are therefore crosslinked polymeric materials in the form of a macroporous gel (cryogel) obtainable by the cryopolymerization process of the invention that, thanks to said specific process, result to be comprised of varying proportions of HEMA and HEMA-R monomers. The molar ratio between the components (HEMA:HEMA-R) may vary between 99.9% HEMA:0.1% HEMA-R and 0.1% HEMA:99.9% HEMA-R Said polymeric material has not only improved filtration characteristics and sequestering properties towards unfractionated heparin (UFH), but is also effective in neutralizing both low molecular weight heparins (LMWH and ULMWH) and heparinoids. Advantages of this polymeric material is that it is easy to manufacture, homogeneous, and it is possible to control the composition of the polymeric material obtained so as to adjust the heparin amount and/or fraction to desirably sequestrated from aqueous solutions, physiological solutions and biological fluids (blood, serum and plasma). According to a preferred aspect, in the materials obtainable by the process of the present invention, all or part of the amino residues in the R groups are salified with a physiologically compatible acid, and are therefore present in cationic form in the finished product. Preferred physiologically compatible acids used to salify the amino groups in pHEMA-R (with varying percentages composition) are organic or inorganic acids such as, for example, hydrochloric, phosphoric, citric, sulfuric, lactic, acetic, trifluoroacetic, and carbonic acid. Particularly preferred are hydrochloric acid and trifluoroacetic acid.

According to a preferred aspect, object of the invention are materials obtainable by the process of the invention, wherein R is not the acyl residue deriving from the amino acid lysine or the amino acid arginine.

Object of the invention is also the use of the crosslinked polymeric materials in the form of a macroporous gel (cryogel) obtainable by the cryopolymerization process of the invention in the biomedical field, in particular the use for the construction of filters, membranes, or devices for the treatment of biological fluids such as, for example, filtering devices for dialysis.

A further object of the invention are therefore filters, membranes, or devices for the treatment of biological fluids which comprise materials obtained by the cryopolymerization process of the invention.

EXAMPLES

Example 1—Synthesis of the Functionalized HEMA-Lys Monomer According to Scheme 2

When the amino acid chosen for HEMA functionalization is lysine, a first step has to be performed in order to free the acid function, as the lysine reagent used is in the form of dicyclohexylamine salt (Boc-Lys(Boc)-OH DCHA). This first step involves the extraction using citric acid aqueous solution (10% by weight). Specifically, 2 g of Boc-Lys (Boc)-OH DCHA dissolved in 70 mL of dichloromethane were extracted using 70 mL of citric acid aqueous solution (×3 times), then the organic layer was washed with water, dried on anhydrous sodium sulfate and evaporated. 1.3 g of Boc-Lys(Boc)-OH (98% yield) were thus obtained.

The protected lysine (1.203 g, 3.473 mmol) was mixed with DMAP (43.02 mg, 0.347 mmol) and DCC (788 mg, 3.82 mmol) and the mixture was dissolved in 15 ml of dry $CH_2Cl_2$ and 2 ml of dry DMF under an inert atmosphere. After complete dissolution, the reaction mixture was brought to 0° C. and 464 µL of HEMA (498 mg, 3.83 mmol) were added. The reaction was thus continued under stirring for 30 minutes at 0° C., and subsequently at room temperature for 24 h. The mixture was then filtered, and the solvent was eliminated by evaporation, the resulting residue was purified by chromatography ($SiO_2$, Hexane/Ethyl Acetate: 70/30). Small amounts of radical inhibitor (p-methoxyphenol) were added to the eluting solvent. 1.35 g of pure HEMA-Boc-Lys(Boc) (Yield: 80%) were obtained.

The following synthetic step involved the removal of the tert-butoxycarbonyl protecting groups to free the amino groups. Such a reaction was performed solubilizing the HEMA-Boc-Lys(Boc) compound in neat trifluoroacetic acid, and maintaining it under stirring at room temperature for about 90 minutes. At the end of the reaction, the system was brought to dryness using a rotary evaporator, dissolved in ethanol, and dried again for three times. 1.36 g of pure HEMA-Lys (Yield: 99%) were thus obtained.

Example 2—Synthesis of a Cryogel Having a Sum of the Monomers Concentration C Equal to 0.5 M and a Ratio Q of (HEMA:HEMA-Lys)=3 (25% pHEMA-Lys)

19 mg (0.0391 mmol) of HEMA-Lys are added to 14.1 µL (0.116 mmol) of HEMA. In parallel, a 0.162 M aqueous solution of MBAA is prepared. From this solution, 158.4 µL are taken and used to dissolve the HEMA-Lys/HEMA mixture. The mixture is brought to 0° C., then small portions of 1,5 M NaOH, until a pH of about 7.8 (25 µL) is reached, and subsequently 81 µL of $H_2O$ (final volume=310 µL), are added. Two aqueous solutions of APS and TEMED, both at 10% w/w, are prepared. To the monomers solution, 6.2 µL of the APS solution, and subsequently 6.2 µL of the TEMED solution, are added under stirring. The mixture thus obtained is cooled by immersion in a bath at a temperature of −14° C., after freezing the temperature is brought to −13° C. and maintained for 24 h. The material obtained after solvent thawing is washed with water and ethanol, and finally dried under a nitrogen flow.

Example 3—Synthesis of a Cryogel Having a Sum of the Monomers Concentration C Equal to 0.5 M and a Ratio Q of (HEMA:HEMA-Lys)=1 (50% pHEMA-Lys)

37.7 mg (0.0775 mmol) of HEMA-Lys are added to 9.4 µL (0.0775 mmol) of HEMA. In parallel, a 0.162 M aqueous solution of MBAA is prepared. From this solution, 158.4 µL are taken and used to dissolve the HEMA-Lys/HEMA mixture. The mixture is brought to 0° C., then small portions of 1,5 M NaOH, until a pH of about 7,8 (45 µL) is reached, and subsequently 42 µL of $H_2O$ (final volume=310 µL), are added. Two aqueous solutions of APS and TEMED, both at 10% w/w, are prepared. To the monomers solution, 8.8 µL of the APS solution, and subsequently 8.8 µL of the TEMED solution, are added under stirring. The mixture thus obtained is cooled by immersion in a bath at a temperature of −14° C., after freezing the temperature is brought to −13° C. and maintained for 24 h. The material obtained after solvent thawing is washed with water and ethanol, and finally dried under a nitrogen flow.

Example 4—Synthesis of a Cryogel Having a Sum of the Monomers Concentration C Equal to 0.5 M and a Ratio Q of (HEMA:HEMA-Lys)=0.33 (75% pHEMA-Lys)

56.4 mg (0.116 mmol) of HEMA-Lys, are added to 4.7 µL (0.039 mmol) of HEMA. In parallel, a 0.162 M aqueous solution of MBAA is prepared. From this solution, 158.4 µL are taken and used to dissolve the HEMA-Lys/HEMA mixture. The mixture is brought to 0° C., then small portions of 1.5 M NaOH, until a pH of about 7.8 (45 µL) is reached, and subsequently 42 µL of $H_2O$ (final volume=310 µL), are added. Two aqueous solutions of APS and TEMED, both at 10% w/w, are prepared. To the monomers solution, 11.5 µL of the APS solution, and subsequently 11.5 µL of the TEMED solution, are added under stirring. The mixture thus obtained is cooled by immersion in a bath at a temperature of −15° C., after freezing the temperature is brought to −13° C. and maintained for 24 h. The material obtained after solvent thawing is washed with water and ethanol, diethyl ether, and finally dried under a nitrogen flow.

The invention claimed is:

1. Process for the synthesis of crosslinked polymeric materials in the form of a macroporous gel comprising a step of freezing a solution in which a polymerization takes place in the presence of a crosslinking agent, containing the HEMA monomer and at least one HEMA-R monomer of the following formula:

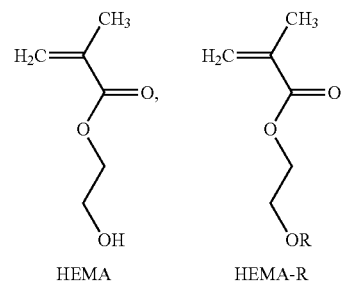

wherein R is the acyl residue of lysine; and wherein the ratio between HEMA and HEMA-R monomers is 50% HEMA:50% HEMA-R or 25% HEMA:75% HEMA-R, and wherein the mole ratio Q of HEMA to HEMA-R is 1 and 0.33, respectively.

2. Process for the synthesis of crosslinked polymeric materials in the form of a macroporous gel according to claim 1, wherein the solution is an aqueous solution, or it comprises a polar organic solvent.

3. Process for the synthesis of crosslinked polymeric materials in the form of a macroporous gel according to claim 1, wherein an amount of crosslinking agent between 1/10 and 1/3 by moles is used, based on the sum of the monomers used by moles.

4. Process for the synthesis of crosslinked polymeric materials in the form of a macroporous gel according to claim 1, wherein the pH of the solution containing the HEMA and HEMA-R monomers, and the crosslinking agent is between 7.0 and 8.0.

5. Process for the synthesis of crosslinked polymeric materials in the form of a macroporous gel according to claim 1, wherein the sum of HEMA and HEMA-R monomers is between 5% and 50% by weight, based on the weight of the solvent used.

6. Process for the synthesis of crosslinked polymeric materials in the form of a macroporous gel according to claim 1, wherein the polymerization reaction takes place at temperatures between −10° C. and −25° C.

7. Process for the synthesis of crosslinked polymeric materials in the form of a macroporous gel according to claim 1, wherein the polymerization reaction takes place between 12 and 48 hours.

8. Process for the synthesis of crosslinked polymeric materials in the form of a macroporous gel according to claim 1, wherein the crosslinking agents are bisacrylates ester or amide derivatives.

9. Process for the synthesis of crosslinked polymeric materials in the form of a macroporous gel according to claim 1, wherein the optional amino groups present on the acyl residue R are at least partially salified with a physiologically compatible acid;
   wherein the physiologically compatible acid is selected from the group consisting of hydrochloric acid, phosphoric acid, citric acid, sulfuric acid, lactic acid, acetic acid, trifluoroacetic acid, and carbonic acid.

10. Crosslinked polymeric materials in the form of a macroporous gel obtainable according to claim 1.

11. Crosslinked polymeric materials in the form of a macroporous gel according to claim 10, wherein the optional amino groups present on the acyl residue R are at least partially salified with a physiologically compatible acid; wherein the physiologically compatible acid is selected from the group consisting of hydrochloric acid, phosphoric acid, citric acid, sulfuric acid, lactic acid, acetic acid, trifluoroacetic acid, and carbonic acid.

12. A method for manufacturing filters, membranes or devices for the treatment of biological fluids, the method comprising providing the crosslinked polymeric materials in the form of a macroporous gel according to claim 10.

13. The method according to claim 12, wherein the device is a filtration device for dialysis.

14. Filters, membranes and/or devices for the treatment of biological fluids which comprise the crosslinked polymeric materials in the form of a macroporous gel according to claim 10.

15. Process for the synthesis of crosslinked polymeric materials in the form of a macroporous gel according to claim 2, wherein the solution is a polar organic solvent selected from dimethylsulfoxide, dioxane, acetamide, tert-butyl alcohol, and a mixture thereof.

16. Process for the synthesis of crosslinked polymeric materials in the form of a macroporous gel according to claim 2, wherein the solution is an aqueous solution.

17. Process for the synthesis of crosslinked polymeric materials in the form of a macroporous gel according to claim 8, wherein the crosslinking agents are selected from N,N'-methylenebisacrylamide, N,N'-methylenebismetacrylamide, N,N'-hexamethylenebisacrylamide, N,N-diallylacrylamide, diallyl fumarate, diallyl phthalate and poly(ethyleneglycol)diacrylate.

18. Process for the synthesis of crosslinked polymeric materials in the form of a macroporous gel according to claim 17, wherein the crosslinking agents are N,N'-methylenebisacrylamide.

19. Process for the synthesis of crosslinked polymeric materials in the form of a macroporous gel according to claim 9, wherein the physiologically compatible acid is hydrochloric acid or trifluoroacetic acid.

20. Crosslinked polymeric materials in the form of a macroporous gel according to claim 11, wherein the physiologically compatible acid is hydrochloric acid or trifluoroacetic acid.

21. A filtration device for dialysis comprising the crosslinked polymeric materials in the form of a macroporous gel according to claim 10.

* * * * *